United States Defensive Publication [19] (H) [11] T975,003

Leonard et al. [43] Oct. 3, 1978

[54] PRIMER COATING COMPOSITIONS COMPRISING POLYALKYLENEIMINE AND CELLULOSE-ACETATE PROPIONATE

[76] Inventors: Don R. Leonard, Rte. 15, 421 Old Castle Rd.; Charles H. Coney, 2008 Canterbury Rd., both of Kingsport, Tenn. 37660

[21] Appl. No.: 849,376

[22] Filed: Nov. 7, 1977

Related U.S. Application Data

[63] Continuation of Ser. No. 779,433, Mar. 21, 1977, abandoned.

[51] Int. Cl.[2] ..... B05D 7/10; B32B 21/08; B32B 27/10

[52] U.S. Cl. ..... 427/407 R; 260/13; 427/407 D; 427/118; 427/408; 427/411; 427/415; 428/476; 428/508

[57] ABSTRACT

Coating compositions comprising polyalkyleneimine and cellulose acetate propionate in solution, and related process and product, are disclosed. Such compositions are particularly useful as primer coatings for substrates of regenerated cellulose, paper and paperboard where cellulose ester top coatings are used. Use of such compositions as primer coatings improves adhesion of the top coating to the substrate, particularly where the coated substrate is heat-sealed, for example, in packaging applications. Also, the coating composition provides increased resistance to blocking, which is especially important where the substrate is sheet material wound in a roll.

8 Claims, No Sheets Drawing,

13 Pages Specification

The file of this unexamined application may be inspected and copies thereof may be purchased (849 O.G. 1221, Apr. 9, 1968).